United States Patent
Hsu

(10) Patent No.: US 10,271,046 B2
(45) Date of Patent: *Apr. 23, 2019

(54) LENS FOCUSING APPARATUS AND CHART DISPLAY MODULE THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Wen-Liang Hsu, Hsinchu County (TW)

(73) Assignees: LITE-ON ELECTRONICS (GUANGZHOU) LIMITED, Guangzhou (CN); LITE-ON TECHNOLOGY CORPORATION, Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/480,832

(22) Filed: Apr. 6, 2017

(65) Prior Publication Data

US 2017/0318285 A1 Nov. 2, 2017

(30) Foreign Application Priority Data

Mar. 9, 2016 (CN) .......................... 2016 1 0133675
Sep. 7, 2016 (CN) .......................... 2016 1 0808730

(51) Int. Cl.
*H04N 17/00* (2006.01)
*G02B 7/04* (2006.01)
*G02B 7/02* (2006.01)
*G02B 13/02* (2006.01)

(52) U.S. Cl.
CPC .......... *H04N 17/002* (2013.01); *G02B 7/021* (2013.01); *G02B 7/04* (2013.01); *G02B 13/02* (2013.01)

(58) Field of Classification Search
CPC .......... G02B 7/04; G02B 13/02; G02B 7/021; H04N 17/002
USPC .................................................. 356/123–137
See application file for complete search history.

(56) References Cited

U.S. PATENT DOCUMENTS

2016/0124238 A1* 5/2016 Hoang ............... G02B 26/0825 353/8
2017/0261401 A1* 9/2017 Hsu .................... G01M 11/0214

* cited by examiner

*Primary Examiner* — Tri T Ton
(74) *Attorney, Agent, or Firm* — Li & Cai Intellectual Property (USA) Office

(57) ABSTRACT

The prevent invention provides a lens focusing apparatus. The lens focusing apparatus comprises a lens holding module for clamping at least one lens to be tested, a chart display module and a focal length shortening module. The chart display module includes a frame assembly, a first chart display and a plurality of second chart displays disposed on the frame assembly. Each second chart display is inclined at a first predetermined angle relative to the first chart display. The focal length shortening module includes a first focal length shortening device and a plurality of second focal length shortening devices. The first focal length shortening device is disposed between the at least one lens and the first chart display, and each second focal length shortening device is disposed between the at least one lens and the corresponding second chart display.

20 Claims, 11 Drawing Sheets

ND CHART
LENS FOCUSING APPARATUS AND CHART DISPLAY MODULE THEREOF

BACKGROUND OF THE INVENTION

1. Field of the Invention

The present invention relates to a focusing apparatus and a display module thereof, and more particularly to a lens focusing apparatus and a chart display module thereof.

2. Description of Related Art

A conventional manual focusing and measuring machine generally includes a manual focusing apparatus for focusing an optical lens on an object so as to obtain clear images of the object. The manual focusing and measuring machine has the advantages of having low cost and simple structure. However, it lacks stability and reliability because the sharpness of the image is determined by nothing other than the human eyes, and since different users may have different visual abilities and different definitions for image sharpness, it requires different users to adjust the machine in order to respectively obtain clear images of an object. Moreover, the sharpness of images directly affects the preciseness of measurement.

Hence, the prior art provides an image focusing system providing a plurality of curve charts indicating the sharpness of images of an object during the manual focusing process so as to improve the precision of manual focusing and to dispense with the need for repeated measurement conducted by different users. However, the detection optical path of the manual focusing and measuring machine is too complex and long such that the height of the manual focusing and measuring machine cannot be reduced.

SUMMARY OF THE INVENTION

One aspect of the present invention relates to a lens focusing apparatus and a chart display module thereof.

One embodiment of the present invention provides a lens focusing apparatus, comprising: a lens holding module, a chart display module and a focal length shortening module. The lens holding module is used for clamping at least one lens to be tested. The chart display module includes a frame assembly, a first chart display disposed on the frame assembly, and a plurality of second chart displays disposed on the frame assembly. Each of the second chart displays is inclined at a first predetermined angle relative to the first chart display. The focal length shortening module includes a first focal length shortening device and a plurality of second focal length shortening devices. The first focal length shortening device is disposed between the at least one lens and the first chart display, and each of the second focal length shortening devices is disposed between the at least one lens and the corresponding second chart display.

Another embodiment of the present invention provides a chart display module, comprising: a frame assembly, a first chart display and a plurality of second chart displays. The first chart display is detachably disposed on the frame assembly. The plurality of second chart displays is detachably disposed on the frame assembly. Each of the second chart displays is inclined at a predetermined adjustable angle relative to the first chart display.

Therefore, because the first focal length shortening device is disposed between the at least one lens and the first chart display and each of the second focal length shortening devices is disposed between the at least one lens and the corresponding second chart display, so that the distance between the first chart display and the at least one lens can be shortened and the distance between the second chart display and the at least one lens can be shortened by matching the first focal length shortening device and the second focal length shortening device. Hence, the whole height of the lens focusing apparatus can be reduced by matching the first focal length shortening device and the second focal length shortening device.

To further understand the techniques, means and effects of the present invention, the following detailed descriptions and appended drawings are hereby referred to, such that, and through which, the purposes, features and aspects of the present invention can be thoroughly and concretely appreciated. However, the appended drawings are provided solely for reference and illustration, without any intention to limit the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DETAILED DESCRIPTION OF THE PREFERRED EMBODIMENTS

The embodiments of a lens focusing apparatus and a chart display module thereof of the present invention are described. Other advantages and objectives of the present invention can be easily understood by one skilled in the art from the disclosure. The present invention can be applied in different embodiments. Various modifications and variations can be made to various details in the description for different applications without departing from the scope of the present invention. The drawings of the present invention are provided only for simple illustrations, but are not drawn to scale and do not reflect the actual relative dimensions. The following embodiments are provided to describe in detail the concept of the present invention, and are not intended to limit the scope thereof in any way.

First Embodiment

Referring to FIG. 1 to FIG. 8, the present invention provides a lens focusing apparatus Z, comprising a lens holding module 1, a chart display module 2 and a focal length shortening module 3.

Figure 1:
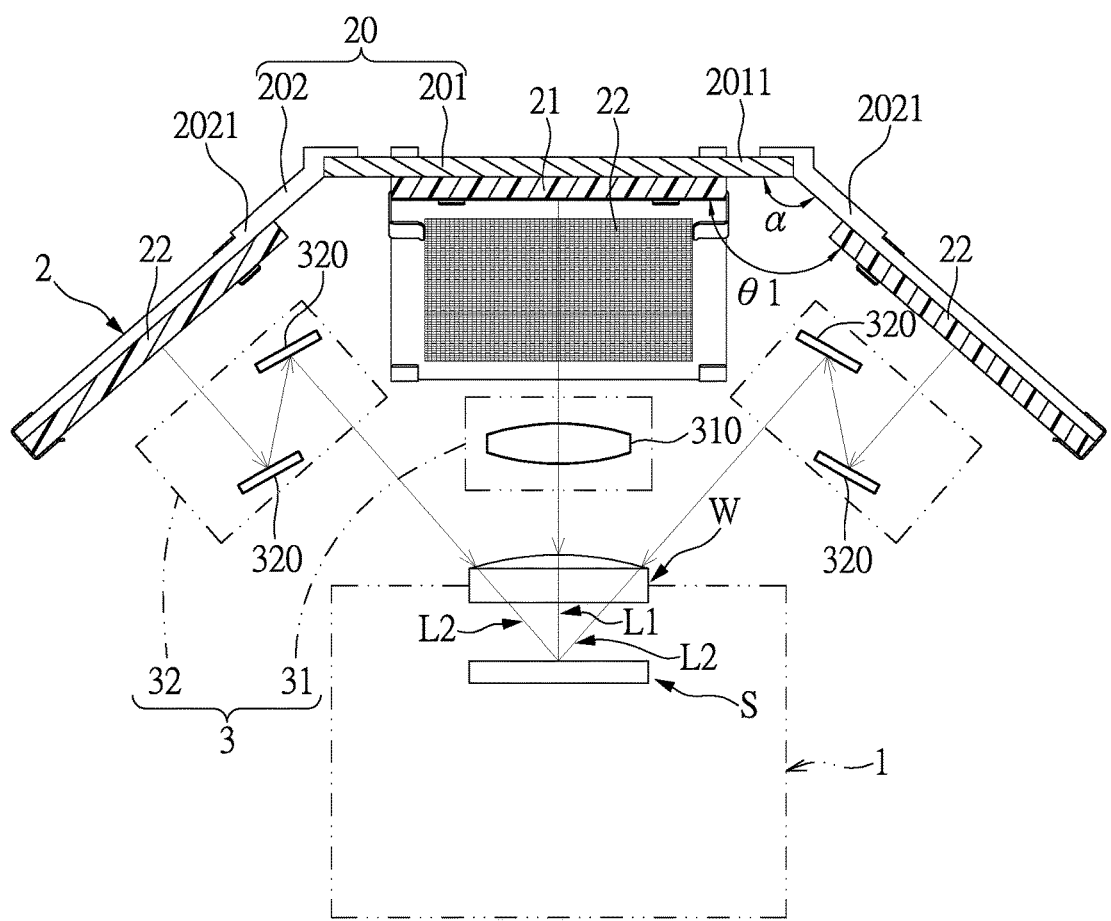
FIG. 1 shows a lateral, cross-sectional, schematic view of the lens focusing apparatus according to a first embodiment of the present invention.
Figure 2:
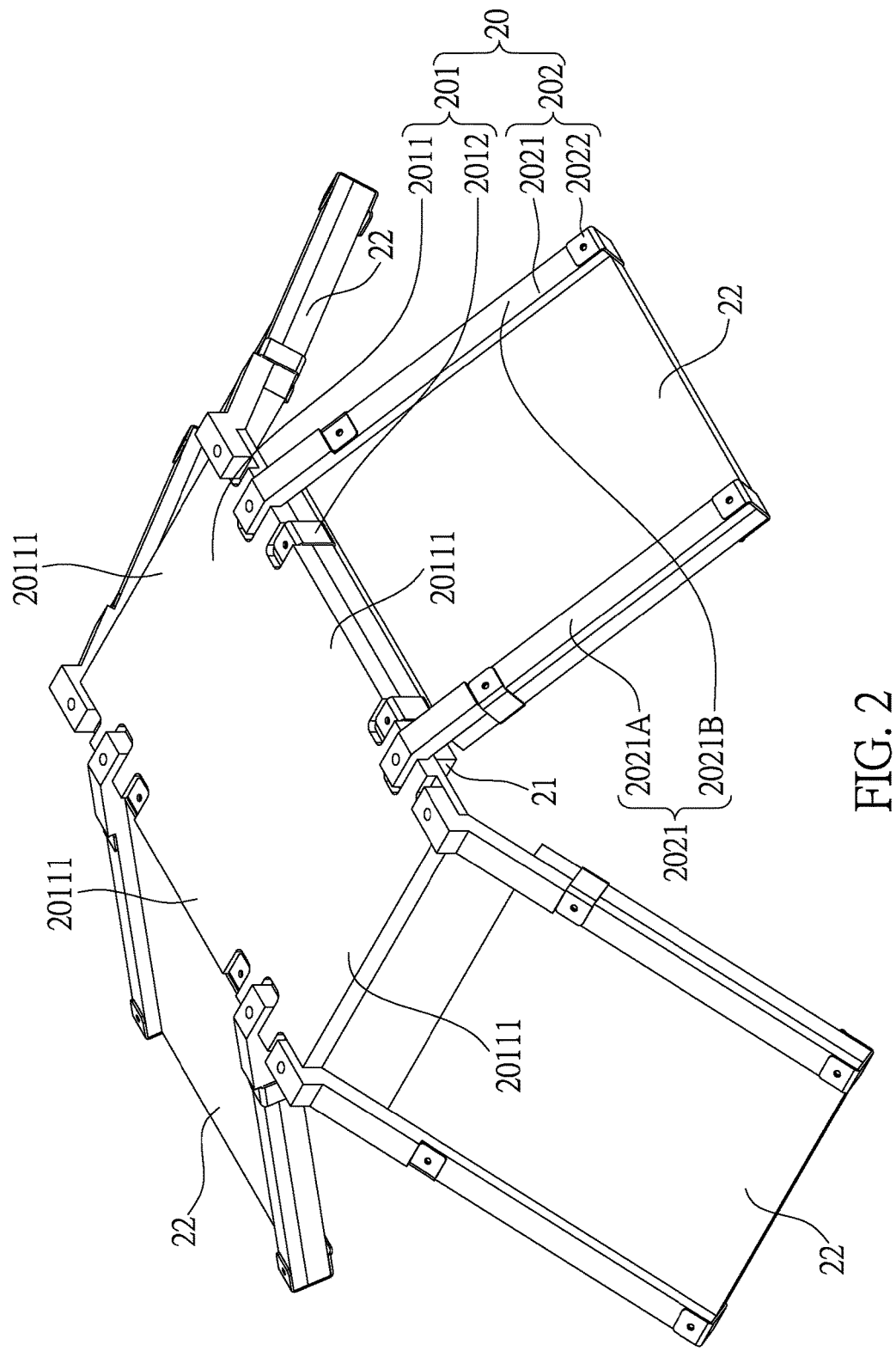
FIG. 2 shows a perspective, schematic view of the chart display module of the lens focusing apparatus according to the first embodiment of the present invention.

First, referring to FIG. 1 and FIG. 2, the lens holding module 1 can be used for clamping at least one lens W to be tested. For example, the at least one lens W may be a non wide angle lens, a wide angle lens or an extra wide angle lens. In addition, the lens holding module 1 may be a six-axis optical adjustment mechanism with a six-axis orientation adjustment function including an X-axis orientation adjustment, a Y-axis orientation adjustment, a Z-axis orientation adjustment, a spin angle adjustment, a front and rear deflection angle adjustment, and a left and right deflection angle adjustment etc., but it is an illustration and is not intended to limit the present invention.

Figure 3:
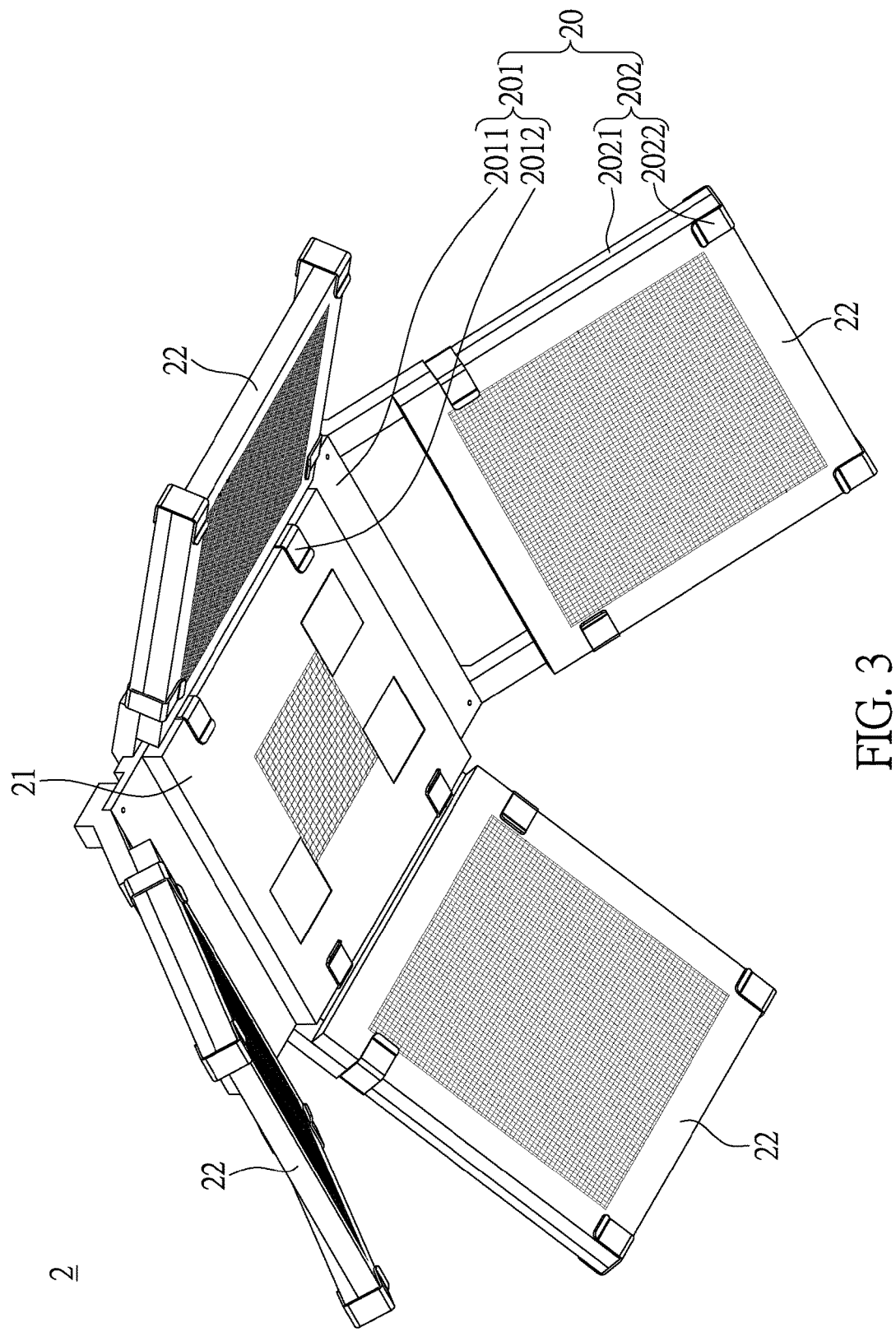
FIG. 3 shows another perspective, schematic view of the chart display module of the lens focusing apparatus according to the first embodiment of the present invention.

Moreover, referring to FIG. 2 and FIG. 3, the chart display module 2 includes a frame assembly 20, a first chart display 21 detachably disposed on the frame assembly 20, and a plurality of second chart display 22 disposed on the frame assembly 20. For example, the first chart display 21 and the plurality of second chart displays 22 can be detachably disposed on the frame assembly 20. Therefore, the first chart display 21 and the second chart displays 22 are replaceable charts, so that it is very convenient for a user to quickly replace charts to focus the at least one lens W. It is worth mentioning that the first chart display 21 and the second chart display 22 can be replaced at the same time.

In addition, the frame assembly 20 includes a first frame 201 and a plurality of second frames 202 fixedly disposed on the first frame 201. However, the above-mentioned description for the frame assembly 20, the first chart display 21 and the second chart displays 22 is an illustration and is not intended to limit the present invention.

Figure 4:
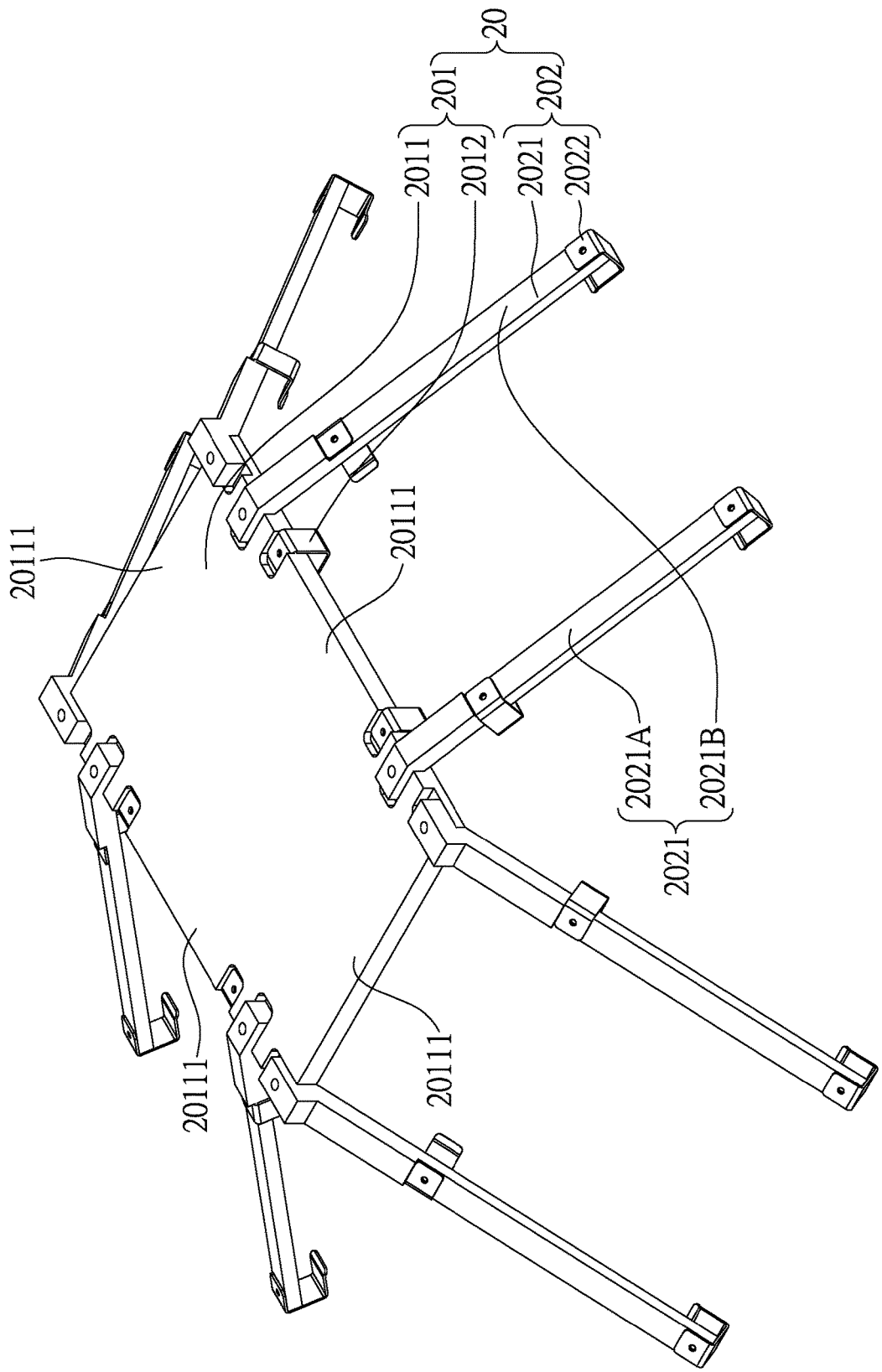
FIG. 4 shows a perspective, schematic view of the frame assembly of the chart display module of the lens focusing apparatus according to the first embodiment of the present invention.

More precisely, referring to FIG. 2, FIG. 3 and FIG. 4, the frame assembly 20 includes a first frame 201 and a plurality of second frames 202 fixedly or adjustably disposed on the first frame 201. Please note, the present invention using the plurality of second frames 202 fixedly or adjustably disposed on the first frame 201 is illustrated in FIG. 1 to FIG. 6, but it is not used to limit the present invention. For example, the present invention can provide a pivot structure pivotally disposed between the first frame 201 and the second frame 202, that is to say, the second frame 202 can pivot on the first frame 201, so that it is very convenient for a user to adjust the inclined angle of the second frame 202 relative to the first frame 201 according to different requirements.

Following the above description, referring to FIG. 2, FIG. 3 and FIG. 4, the first frame 201 includes a first frame body 2011 and a plurality of first clamping elements 2012 disposed on the first frame body 2011, and each second frame 202 includes a second frame body 2021 fixedly (or adjustably) disposed on the first frame body 2011 and a plurality of second clamping elements 2022 disposed on the second frame body 2021. More precisely, the first frame body 2011 has a plurality of lateral side portions 20111, and the second frame bodies 2021 respectively fixedly (or adjustably) disposed on the lateral side portions 20111 of the first frame body 2011. In addition, as shown in FIG. 1, each second frame body 2021 can be inclined at a predetermined adjustable angle α relative to the first frame body 2011 according to different requirements; so that each second chart display 22 can be also inclined at a first predetermined angle θ1 relative to the first chart display 21. That is to say, the first predetermined angle θ1 of the second chart display 22 relative to the first chart display 21 can be determined according to the predetermined adjustable angle α of the second frame body 2021 relative to the first frame body 2011.

Therefore, the first chart display 21 can be positioned on the first frame body 2011 by clamping of the first clamping elements 2012 of the first frame 201, and each second chart display 22 can be positioned on the corresponding second frame body 2021 by clamping of the second clamping elements 2022 of the corresponding second frame 202.

Therefore, as shown in FIG. 2 or FIG. 3, the first chart display 21 can be positioned on the first frame body 2011 by clamping of the first clamping elements 2012 of the first frame 201, and each second chart display 22 can be positioned on the corresponding second frame body 2021 by clamping of the second clamping elements 2022 of the corresponding second frame 202.

For example, as shown in FIG. 2 or FIG. 4, each second frame body 2021 includes at least two extending arms (2021A, 2021B) fixedly (or adjustably) disposed on the first frame body 2011, and each second chart display 22 can be positioned between the at least two extending arms (2021A, 2021B) of the corresponding second frame body 2021 by clamping of the second clamping elements 2022 of the corresponding second frame 202. However, the above-mentioned design for the second frame body 2021 with the at least two extending arms (2021A, 2021B) is an illustration and is not intended to limit the present invention.

Figure 5:
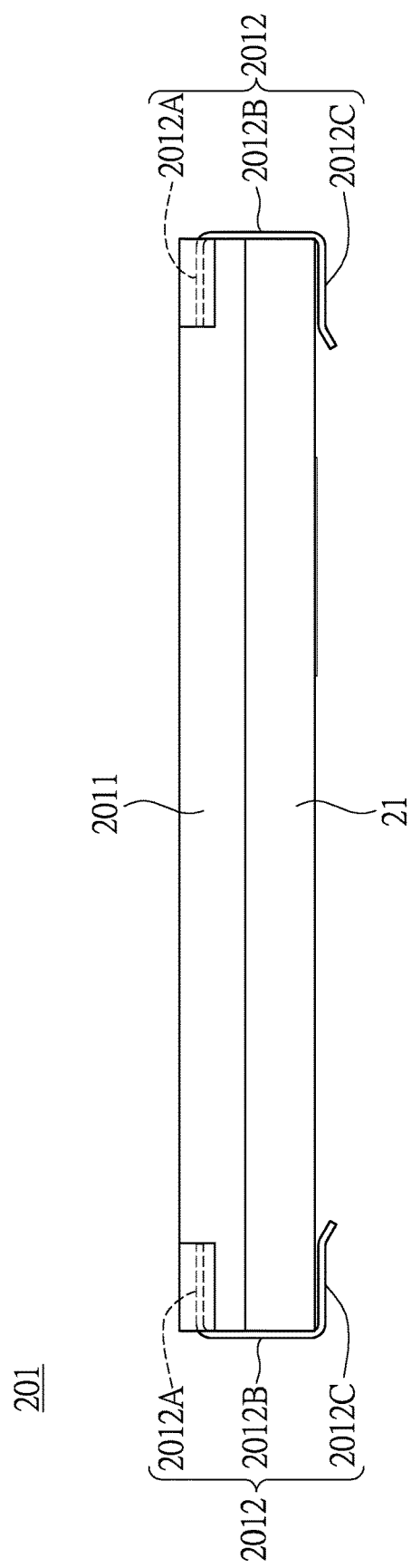
FIG. 5 shows a lateral, schematic view of the first frame of the frame assembly of the chart display module of the lens focusing apparatus according to the first embodiment of the present invention.

For example, referring to FIG. 4 and FIG. 5, the first clamping element 2012 of the first frame 201 has a first fixing portion 2012A fixed on the first frame body 2011, a first position limiting portion 2012B extended outwardly from the first fixing portion 2012A to limit (or restrict) the position of the first chart display 21, and a first pressing portion 2012C connected to the first position limiting portion 2012B to abut against (or press) the first chart display 21. That is to say, the positioning effect of the first chart display 21 can be increased by matching the first position limiting portion 2012B and the first pressing portion 2012C. However, the above-mentioned design for the first clamping element 2012 with the first fixing portion 2012A, the first position limiting portion 2012B and the first pressing portion 2012C is an illustration and is not intended to limit the present invention.

Figure 6:
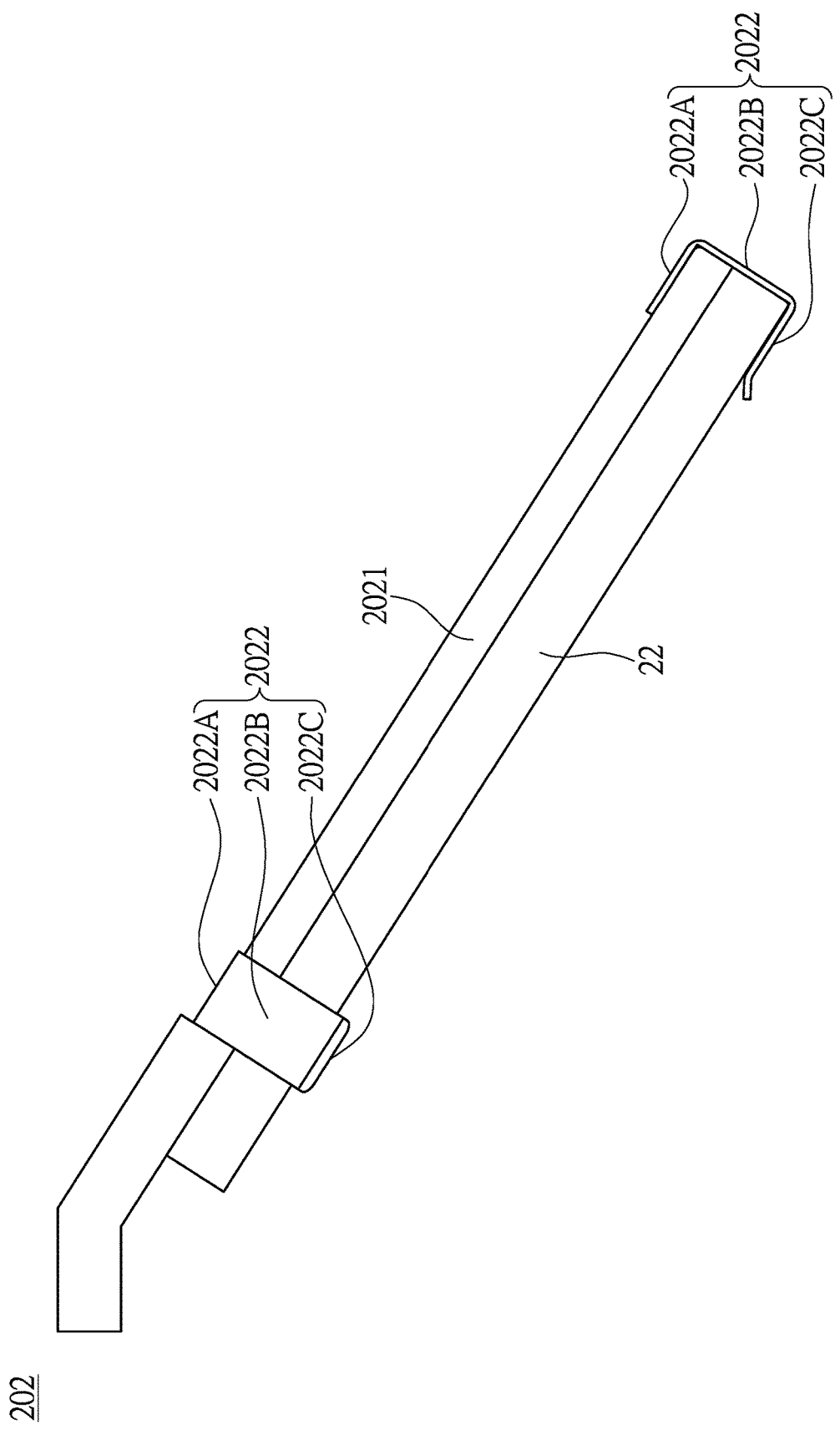
FIG. 6 shows a lateral, schematic view of the second frame of the frame assembly of the chart display module of the lens focusing apparatus according to the first embodiment of the present invention.

For example, referring to FIG. 4 and FIG. 6, the second clamping element 2022 of the second frame 202 has a second fixing portion 2022A fixed on the second frame body 2021, a second position limiting portion 2022B extended outwardly from the second fixing portion 2022A to limit (or restrict) the position of the second chart display 22, and a second pressing portion 2022C connected to the second position limiting portion 2022B to abut against (or press) the second chart display 22. That is to say, the positioning effect of the second chart display 22 can be increased by matching the second position limiting portion 2022B and the second pressing portion 2022C. However, the above-mentioned design for the second clamping element 2022 with the second fixing portion 2022A, the second position limiting portion 2022B and the second pressing portion 2022C is an illustration and is not intended to limit the present invention.

Furthermore, as shown in FIG. 1, the focal length shortening module 3 includes a first focal length shortening device 31 and a plurality of second focal length shortening devices 32. The first focal length shortening device 31 is disposed between the at least one lens W and the first chart display 21, and each second focal length shortening device 32 is disposed between the at least one lens W and the corresponding second chart display 22. For example, the first focal length shortening device 31 includes at least one telephoto lens 310, and each second focal length shortening device 32 includes at least two reflecting mirrors 320. However, the above-mentioned design for the first focal length shortening device 31 and the second focal length shortening device 32 is an illustration and is not intended to limit the present invention.

Following the above description, a first chart image generated by the first chart display 21 can sequentially pass through the at least one telephoto lens 310 and the at least one lens W to form a first image light beam L1 that is projected onto an image sensing element S. In addition, a second chart image generated by the second chart display 22 can be sequentially reflected by the at least two reflecting mirrors 320 in advance and then pass through the at least one lens W to form a second image light beam L2 that is projected onto the same image sensing element S. Therefore, the lens focusing apparatus Z can focus at least one lens W due to the first image light beam L1 and the second image light beam L2 captured by the image sensing element S.

Please note, the distance between the first chart display 21 and the at least one lens W can be shortened in the lens focusing apparatus Z due to usage of the first focal length shortening device 31, and the distance between the second chart display 22 and the at least one lens W can be shortened in the lens focusing apparatus Z due to usage of the second focal length shortening device 32. That is to say, the whole height of the lens focusing apparatus Z can be reduced due to the usage of the first focal length shortening device 31 and the second focal length shortening device 32.

Figure 7:
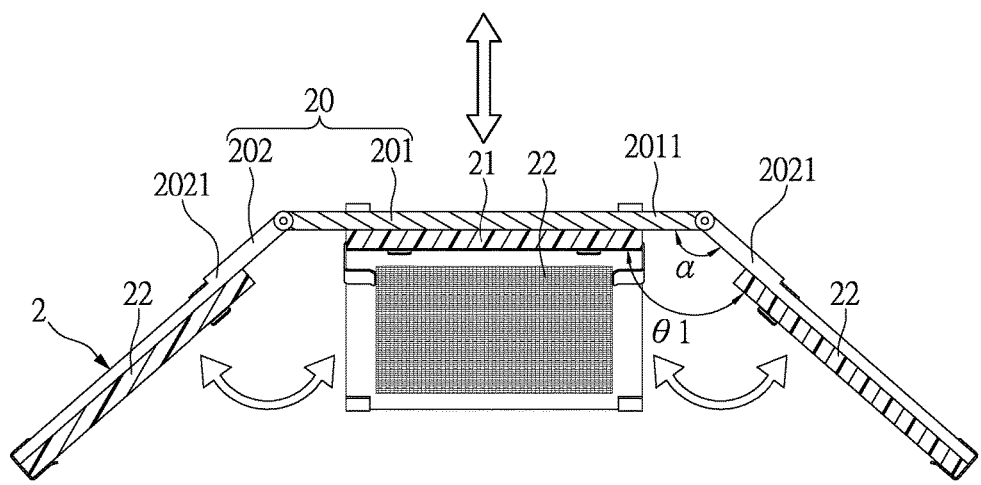
FIG. 7 shows a lateral, cross-sectional, schematic view of the lens focusing apparatus using another type of chart display module according to the first embodiment of the present invention.

Referring to FIG. 7, the second frames 202 of the frame assembly 20 can be pivotally disposed on the first frame 201. Therefore, referring to the angle adjustment arrows as shown in FIG. 7, when the inclined predetermined adjustable angle α of the second frame body 2021 relative to the first frame body 2011 is adjusted, the first predetermined angle θ1 of the second chart display 22 relative to the first chart display 21 is adjusted following the adjustment of the predetermined adjustable angle α of the second frame body 2021. That is to say, according to different requirements, the first predetermined angle θ1 of the second chart display 22 relative to the first chart display 21 can be determined according to the predetermined adjustable angle α of the second frame body 2021 relative to the first frame body 2011. Please note, referring to the raising and lowering adjustment arrow as shown in FIG. 7, because the frame assembly 20 can be moved upwardly or downwardly, the height positions of the first chart display 21 and the second chart display 22 can be adjusted following the raising and lowering adjustment of the frame assembly 20.

Figure 8:
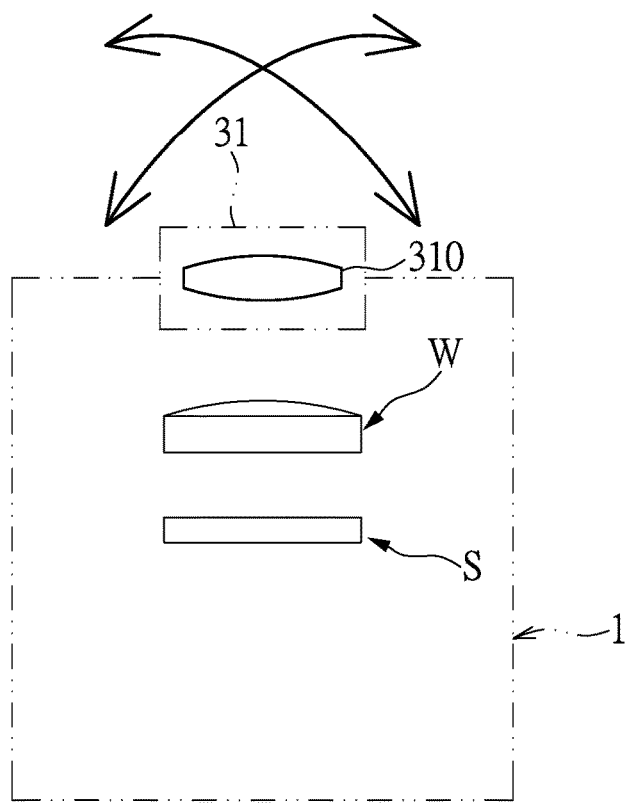
FIG. 8 shows a schematic view of both the first focal length shortening device and the lens concurrently clamped on the lens holding module according to the first embodiment of the present invention.

Referring to FIG. 8, the first focal length shortening device 31 of the lens focusing apparatus Z can be directly disposed on the lens holding module 1, so that both the at least one lens W and the at least one telephoto lens 310 of the first focal length shortening device 31 can be concurrently clamped on the lens holding module 1. Hence, both the at least one lens W and the at least one telephoto lens 310 can be concurrently adjusted following the lens holding module 1. In other words, in another aspect, the at least one telephoto lens 310 can be used as a glass that is placed in front of the at least one lens W, so that the at least one telephoto lens can be swung following the at least one lens W for scanning the first chart display 21 and the second chart displays 22 (i.e., scanning five areas on five charts, respectively). Therefore, the optical path of the lens focusing apparatus Z can be shortened, and the at least one lens W can be tested by the lens focusing apparatus Z to obtain a finished lens product at infinity.

Second Embodiment

Figure 9:
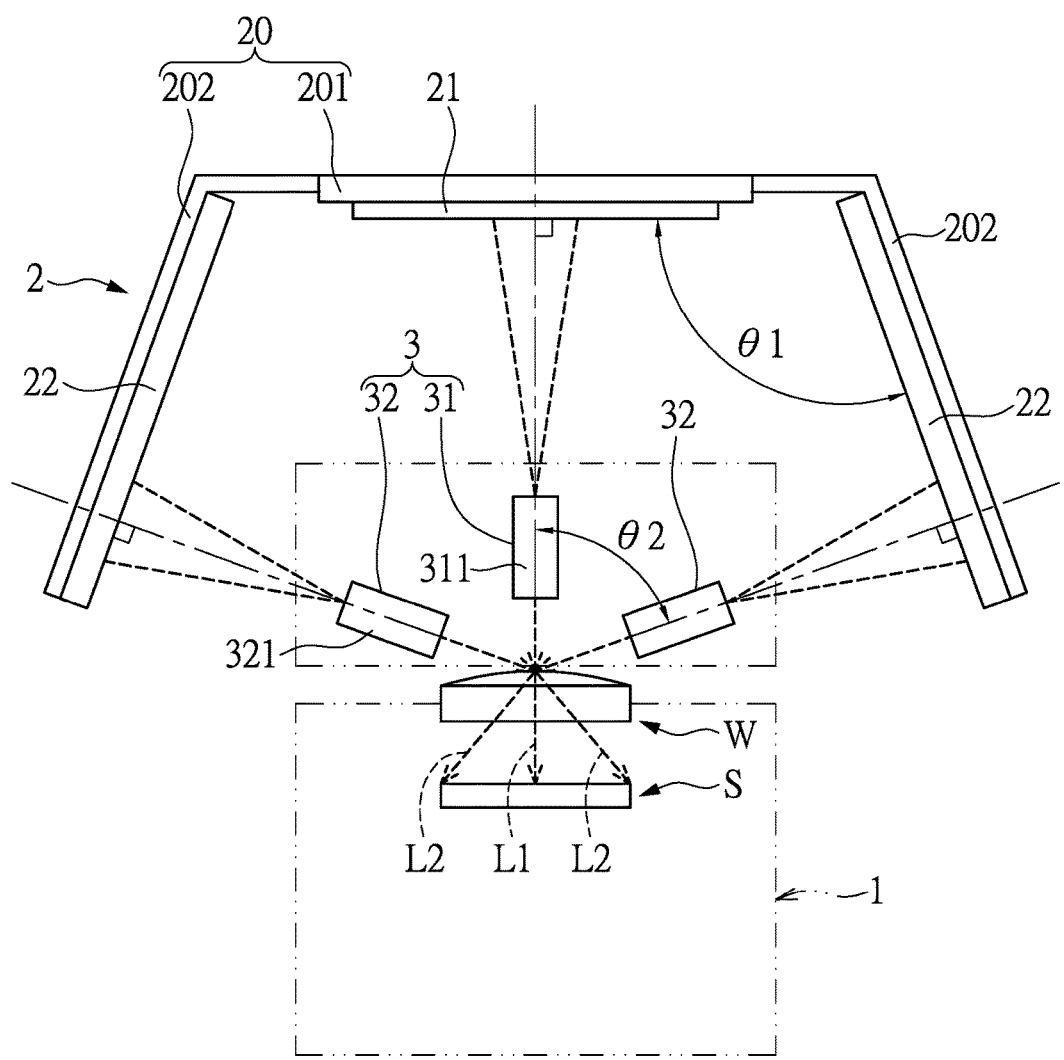
FIG. 9 shows a lateral, schematic view of the lens focusing apparatus according to a second embodiment of the present invention.
Figure 10:
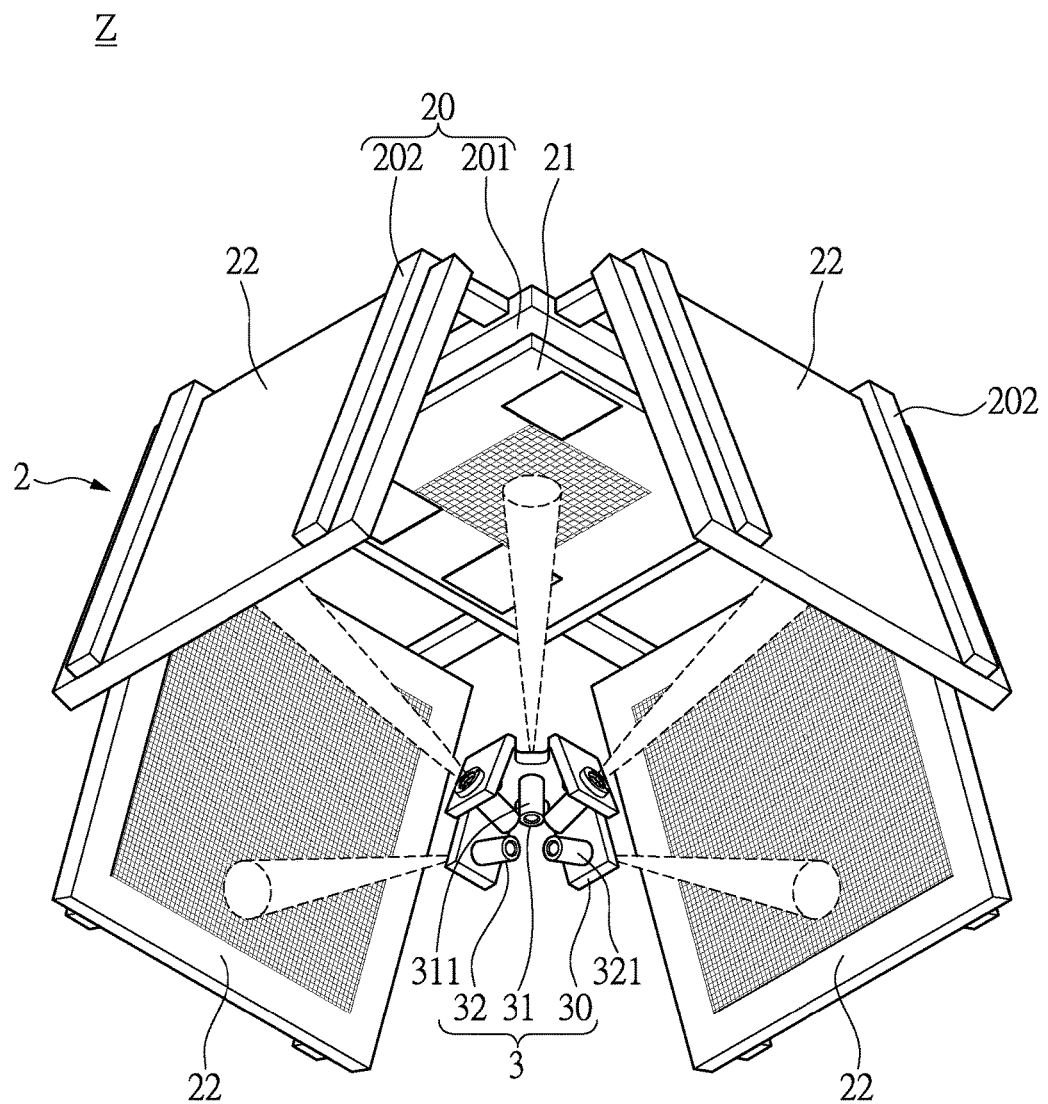
FIG. 10 shows a perspective, schematic view of the lens focusing apparatus according to the second embodiment of the present invention.
Figure 11:
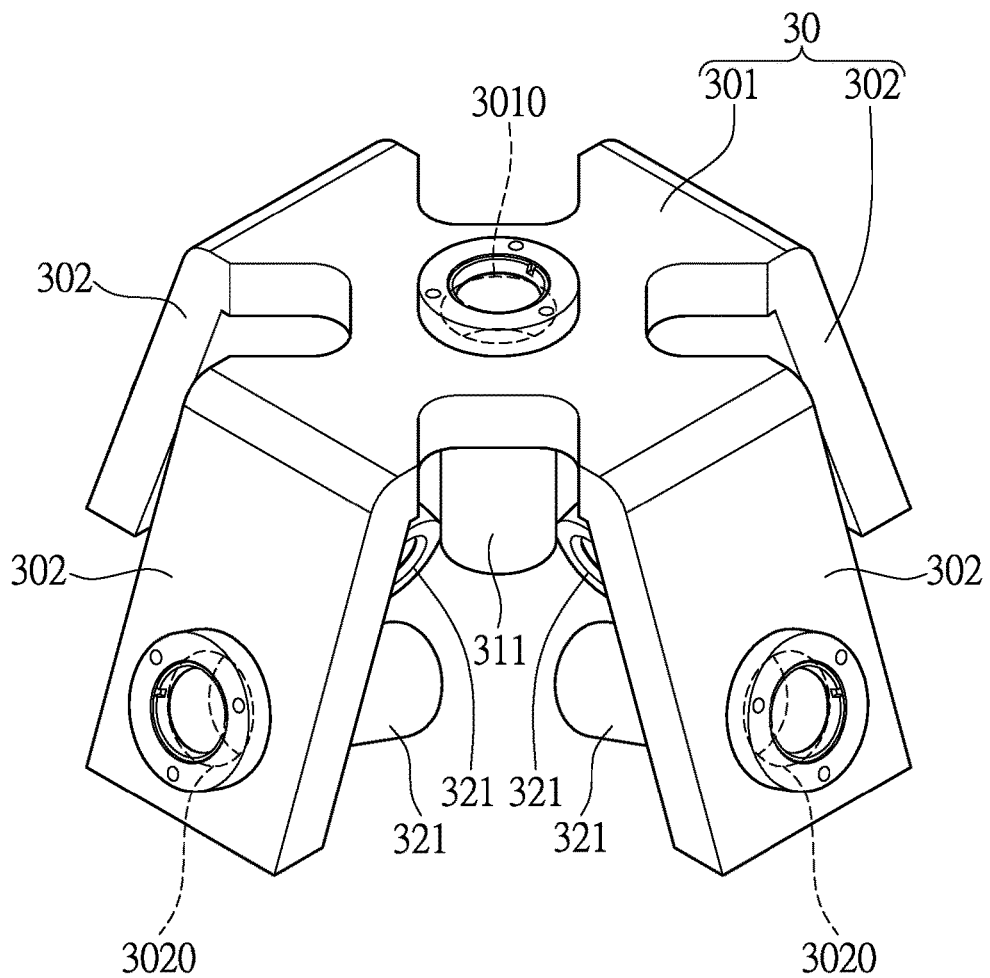
FIG. 11 shows a perspective, schematic view of the long-focus lens module of the lens focusing apparatus according to the second embodiment of the present invention.

Referring to FIG. 9 to FIG. 11, the second embodiment of the present invention provides a lens focusing apparatus Z, including: a lens holding module 1, a chart display module 2 and a focal length shortening module 3.

The difference between the second embodiment and the first embodiment is that, as shown in FIG. 9 and FIG. 10, the focal length shortening module 3 further includes a lens frame assembly 30. A first focal length shortening device 31 and a plurality of second focal length shortening devices 32 are disposed on the lens frame assembly 30, and each second focal length shortening device 32 is inclined at a second predetermined angle θ2 relative to the first focal length shortening device 31. More precisely, the first focal length shortening device 31 further includes a first long-focus lens 311 (such as a first telephoto lens), and each second focal length shortening device 32 includes a second long-focus lens 321 (such as second telephoto lenses). Referring to FIG. 9 and FIG. 10, the first long-focus lens 311 is disposed between the at least one lens W and the first chart display 21, and each second long-focus lens 321 is disposed between the at least one lens W and the corresponding second chart display 22.

For example, as shown in FIG. 11, the lens frame assembly 30 includes a first lens frame 301 and a plurality of second lens frames 302 surroundingly disposed on the first lens frame 301. Furthermore, the first long-focus lens 311 can pass through a first through hole 3010 of the first lens frame 301 so as to be fixed to the first lens frame 301 of the lens frame assembly 30, and each second long-focus lens 321 can pass through a second through hole 3020 of the corresponding second lens frame 302 so as to be fixed to the second lens frame 302 of the lens frame assembly 30. However, the above-mentioned description for the lens frame assembly 30 is an illustration and is not intended to limit the present invention.

As shown in FIG. 9, please note that the first predetermined angle at which each second chart display 22 is inclined relative to the first chart display 21 is defined as θ1, the second predetermined angle at which each second long-focus lens 321 is inclined relative to the first long-focus lens 311 is defined as θ2, and the first predetermined angle θ1 and the second predetermined angle θ2 conform to the following relationship: θ1+θ≈180 degree. That is to say the first predetermined angle θ1 and the second predetermined angle θ2 are substantially supplementary to each other.

Therefore, referring to FIG. 9 and FIG. 10, a first chart image generated by the first chart display 21 can sequentially pass through the first long-focus lens 311 and the at least one lens W to form a first image light beam L1 that is projected onto an image sensing element S. In addition, a second chart image generated by each second chart display 22 can sequentially pass through the corresponding second long-focus lens 321 and the at least one lens W to form a second image light beam L2 that is projected onto the same image sensing element S. Therefore, the lens focusing apparatus Z can be used to focus the at least one lens W due to the first image light beam L1 and the second image light beams L2 captured by the image sensing element S.

As shown in FIG. 9 to FIG. 11, please note that the distance (or the optical path) between the first chart display 21 and the at least one lens W can be shortened by using the first long-focus lens 311 of the lens focusing apparatus Z, and the distance (or the optical path) between the second chart display 22 and the at least one lens W can be shortened by using the second long-focus lens 321 of the lens focusing apparatus Z, so that the whole height of the lens focusing apparatus Z can be reduced. That is to say, the whole height of the lens focusing apparatus Z can be reduced by matching the first long-focus lens 311 and the second long-focus lens 321 so as to obtain a miniaturized lens focusing apparatus Z. Hence, the at least one lens W can be tested by the lens focusing apparatus Z so as to obtain a finished lens at infinity. Please note that the lens focusing apparatus Z can provide a wide FOV (Field Of View), so that the finished lens W with full viewing angle can be obtained by the lens focusing apparatus Z.

In conclusion, the first chart display 21 and the plurality of second chart displays 22 are replaceable charts due to the designs of "the first chart display 21 is detachably disposed on the frame assembly 20" and "the second chart displays 22 are detachably disposed on the frame assembly 20", so that it is very convenient for a user to quickly replace charts to focus the at least one lens W.

In addition, since the first long-focus lens 311 is disposed between the at least one lens W and the first chart display 21 and each second long-focus lens 321 is disposed between the at least one lens W and the corresponding second chart display 22, the distance between the first chart display 21 and the at least one lens W can be shortened and the distance between the second chart display 22 and the at least one lens W can be shortened by matching the first focal length shortening device 31 and the second focal length shortening device 32. Hence, the whole height of the lens focusing apparatus Z can be reduced by matching the first focal length shortening device 31 and the second focal length shortening device 32. That is to say, the whole height of the lens focusing apparatus Z can be reduced by matching the first focal length shortening device 31 and the second focal length shortening device 32 so as to obtain a miniaturized lens focusing apparatus Z.

On the other hand, the focal length shortening module 3 provided by the second embodiment of the present invention further includes a lens frame assembly 30. Since "a first focal length shortening device 31 and a plurality of second focal length shortening devices 32 are disposed on the lens frame assembly 30", "each second focal length shortening device 32 is inclined at a second predetermined angle θ2 relative to the first focal length shortening device 31" and "the first focal length shortening device 31 further includes a first long-focus lens 311 and each second focal length shortening device 32 includes a second long-focus lens 321", the distance between the first chart display 21 and the at least one lens W can be shortened and the distance between the second chart display 22 and the at least one lens W can be shortened by matching the first long-focus lens 311 and the second long-focus lens 321. Hence, the whole height of the lens focusing apparatus Z can be reduced by matching the first long-focus lens 311 and the second long-focus lens 321. The whole height of the lens focusing apparatus Z can be reduced by matching the first long-focus lens 311 and the second long-focus lens 321 so as to obtain a miniaturized lens focusing apparatus Z. Hence, the at least one lens W can be tested by the lens focusing apparatus Z so as to obtain a finished lens at infinity. The lens focusing apparatus Z provides a wide FOV (Field Of View), so that the finished lens W with full viewing angle can be obtained by the lens focusing apparatus Z.

The aforementioned descriptions merely represent the preferred embodiments of the present invention, without any intention to limit the scope of the present invention which is fully described only within the following claims. Various equivalent changes, alterations or modifications based on the claims of the present invention are all, consequently, viewed as being embraced by the scope of the present invention.

What is claimed is:
1. A lens focusing apparatus, comprising:
   a chart display module including:
      a frame assembly including:
         a first frame including a first frame body and a plurality of first clamping elements disposed on the first frame body; and
         a plurality of second frames adjustably disposed on the first frame, each including a second frame body adjustably disposed on the first frame body and a plurality of second clamping elements disposed on the second frame body;
      a first chart display disposed on the frame assembly and configured to generate a first chart image; and
      a plurality of second chart displays, each being disposed on the frame assembly and configured to generate a second chart image, wherein the second chart displays are disposed at a first predetermined angle relative to the first chart display; and
   a focal length shortening module including:
      a first focal length shortening device disposed between at least one lens to be tested and the first chart display, and configured to receive the first chart image and direct the first chart image to the at least one lens; and
      a plurality of second focal length shortening devices, each being disposed between the at least one lens and a corresponding one of the second chart displays, and configured to receive the second chart image and direct the second chart image to the at least one lens.

2. The lens focusing apparatus of claim 1, wherein the first frame body has a plurality of lateral side portions, the second frame bodies are respectively disposed on the lateral side portions of the first frame body, and each of the second frame bodies is disposed at a predetermined adjustable angle relative to the first frame body.

3. The lens focusing apparatus of claim 1, wherein the first chart display is clamped on the first frame body by the first clamping elements, and each of the second chart displays is clamped on the corresponding second frame body by the second clamping elements.

4. The lens focusing apparatus of claim 1, wherein each of the second frame bodies includes at least two extending arms disposed on the first frame body, and each of the second chart displays is clamped between the at least two extending arms of the corresponding second frame body by the second clamping elements.

5. The lens focusing apparatus of claim 1, wherein each of the first clamping elements has a first fixing portion fixed on the first frame body, a first position limiting portion extended from the first fixing portion to limit the position of the first chart display, and a first pressing portion connected to the first position limiting portion to abut against the first chart display, and each of the second clamping elements has a second fixing portion fixed on the second frame body, a second position limiting portion extended from the second fixing portion to limit the position of the second chart display, and a second pressing portion connected to the second position limiting portion to abut against the second chart display.

6. The lens focusing apparatus of claim 1, wherein the first focal length shortening device includes at least one telephoto lens and each of the second focal length shortening devices includes at least two reflecting mirrors.

7. The lens focusing apparatus of claim 1, wherein the first focal length shortening device is disposed on the lens holding module, so that both the at least one lens and the first focal length shortening device are clamped on the lens holding module.

8. The lens focusing apparatus of claim 7, wherein the first focal length shortening device includes at least one telephoto lens.

9. The lens focusing apparatus of claim 1, wherein the focal length shortening module further comprises a lens frame assembly on which the first focal length shortening device and the plurality of second focal length shortening devices are disposed, and wherein each of the second focal length shortening devices is disposed at a second predetermined angle relative to the first focal length shortening device.

10. The lens focusing apparatus of claim 9, wherein the first focal length shortening device includes a first long-focus lens, and each of the second focal length shortening devices includes a second long-focus lens.

11. The lens focusing apparatus of claim 10, wherein the first chart display is fixed to the first frame body by the first clamping elements of the first frame, and each of the second chart displays is fixed to the corresponding second frame body by the second clamping elements of the corresponding second frame.

12. The lens focusing apparatus of claim 10, wherein the lens frame assembly includes a first lens frame and a plurality of second lens frames surroundingly disposed on the first lens frame, the first long-focus lens passes through a first through hole of the first lens frame, and each of the second long-focus lenses passes through a second through hole of a corresponding one of the second lens frames.

13. The lens focusing apparatus of claim 10, wherein the first chart image generated by the first chart display sequentially passes through the first long-focus lens and the at least one lens to form a first image light beam that is projected onto an image sensing element, and the second chart image generated by each of the second chart displays sequentially passes through a corresponding one of the second long-focus lenses and the at least one lens to form a second image light beam that is projected onto an image sensing element.

14. The lens focusing apparatus of claim 10, wherein each of the second long-focus lenses is disposed at the second predetermined angle relative to the first long-focus lens, and a sum of the first predetermined angle and the second predetermined angle is 180 degree.

15. A lens focusing apparatus, comprising:
a chart display module including:
a frame assembly including a first frame and a plurality of second frames disposed on the first frame;
a first chart display disposed on the first frame and configured to generate a first chart image; and
a plurality of second chart displays, each being disposed on the second frame and configured to generate a second chart image, wherein each of the second chart displays is disposed at a first predetermined angle relative to the first chart display; and
a focal length shortening module including:
a lens frame assembly;
a first focal length shortening device including a first long-focus lens, disposed on the lens frame assembly and between at least one lens to be test and the first chart display, and configured to receive the first chart image; and
a plurality of second focal length shortening devices, each including a second long-focus lens and being disposed on the lens frame assembly and between the at least one lens and a corresponding one of the second chart displays, and configured to receive the second chart image;
wherein the first chart image passes through the first focal length shortening device and the at least one lens, and the second chart image passes through the second focal length shortening device and the at least one lens, and
wherein each of the second focal length shortening devices is disposed at a second predetermined angle relative to the first focal length shortening device.

16. The lens focusing apparatus of claim 15, wherein the first frame includes a first frame body and a plurality of first clamping elements disposed on the first frame body, and each of the second frames includes a second frame body disposed on the first frame body and a plurality of second clamping elements disposed on the second frame body.

17. The lens focusing apparatus of claim 16, wherein the first chart display is fixed to the first frame body by the first clamping elements of the first frame, and each of the second chart displays is fixed to a corresponding one of the second frame bodies by the second clamping elements of the corresponding second frame.

18. The lens focusing apparatus of claim 15, wherein the lens frame assembly includes a first lens frame and a plurality of second lens frames surroundingly disposed on the first lens frame, the first long-focus lens passes through a first through hole of the first lens frame, and each of the second long-focus lenses passes through a second through hole of a corresponding one of the second lens frames.

19. The lens focusing apparatus of claim 15, wherein the first chart image sequentially passes through the first long-focus lens and the at least one lens to form a first image light beam that is projected onto an image sensing element, and the second chart image sequentially passes through a corresponding one of the second long-focus lenses and the at least one lens to form a second image light beam that is projected onto an image sensing element.

20. The lens focusing apparatus of claim 15, wherein each of the second long-focus lenses is disposed at the second predetermined angle relative to the first long-focus lens, and a sum of the first predetermined angle and the second predetermined angle is 180 degree.

* * * * *